(12) United States Patent
Kawabuchi et al.

(10) Patent No.: US 10,502,968 B2
(45) Date of Patent: Dec. 10, 2019

(54) IMAGE DISPLAY APPARATUS

(71) Applicant: Mitsubishi Electric Corporation, Tokyo (JP)

(72) Inventors: Shinji Kawabuchi, Tokyo (JP); Osamu Miyakawa, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/002,300

(22) Filed: Jun. 7, 2018

(65) Prior Publication Data

US 2018/0373054 A1   Dec. 27, 2018

(30) Foreign Application Priority Data

Jun. 22, 2017   (JP) ................................. 2017-122228

(51) Int. Cl.
*G02F 1/1333*   (2006.01)
*G02B 27/22*   (2018.01)
(Continued)

(52) U.S. Cl.
CPC ......... *G02B 27/2214* (2013.01); *G02F 1/137* (2013.01); *G02F 1/13439* (2013.01);
(Continued)

(58) Field of Classification Search
CPC .......... G02B 27/2214; G02F 1/133345; G02F 1/13439; G02F 1/137; G02F 1/134309; G02F 1/1347
(Continued)

(56) References Cited

U.S. PATENT DOCUMENTS 6,970,290 B1   11/2005   Mashitani et al.
2013/0135545 A1*   5/2013   Jung .................... G02F 1/13306
349/33
(Continued)

FOREIGN PATENT DOCUMENTS

JP   H03-119889 A   5/1991
JP   2001-166259 A   6/2001
(Continued)

*Primary Examiner* — Charles S Chang
(74) *Attorney, Agent, or Firm* — Studebaker & Brackett PC

(57) ABSTRACT

An image display apparatus includes a parallax-barrier shutter panel including a plurality of sub-pixels arranged widthwise, the sub-pixels each being changeable between a light transmittance state and a light block state by driving a liquid crystal layer held between a first transparent substrate and a second transparent substrate with a first transparent electrode extending lengthwise. The first transparent substrate includes in a display area, a lower-layer first transparent electrode disposed under an interlayer insulating film and an upper-layer first transparent electrode disposed on the interlayer insulating film, the lower-layer first transparent electrode and the upper-layer first transparent electrode being the first transparent electrode. The first transparent substrate includes in an area adjacent to the display area, a lower-layer metal wire disposed under the interlayer insulating film and an upper-layer metal wire disposed on the interlayer insulating film. A lower-layer transparent electrode is connected to the lower-layer metal wire.

9 Claims, 11 Drawing Sheets

(51) Int. Cl.
*G02F 1/1343* (2006.01)
*G02F 1/137* (2006.01)
*G02F 1/1347* (2006.01)

(52) U.S. Cl.
CPC .. *G02F 1/133345* (2013.01); *G02F 1/134309* (2013.01); *G02F 1/1347* (2013.01)

(58) Field of Classification Search
USPC .......................................................... 349/15
See application file for complete search history.

(56) References Cited

U.S. PATENT DOCUMENTS

| | | |
|---|---|---|
| 2014/0085439 A1 | 3/2014 | Niwano et al. |
| 2014/0198099 A1* | 7/2014 | Tseng ................ G02B 27/2214 345/419 |
| 2016/0198149 A1 | 7/2016 | Yuuki et al. |
| 2016/0286193 A1 | 9/2016 | Niwano et al. |
| 2016/0291337 A1 | 10/2016 | Ochiai et al. |
| 2016/0291338 A1* | 10/2016 | Ochiai ............... G02B 27/2214 |
| 2017/0219836 A1* | 8/2017 | Hyodo ............... G02B 27/2214 |

FOREIGN PATENT DOCUMENTS

| | | |
|---|---|---|
| JP | 2014-066956 A | 4/2014 |
| JP | 2016-191890 A | 11/2016 |
| JP | 2017-058682 A | 3/2017 |

* cited by examiner

F I G. 2
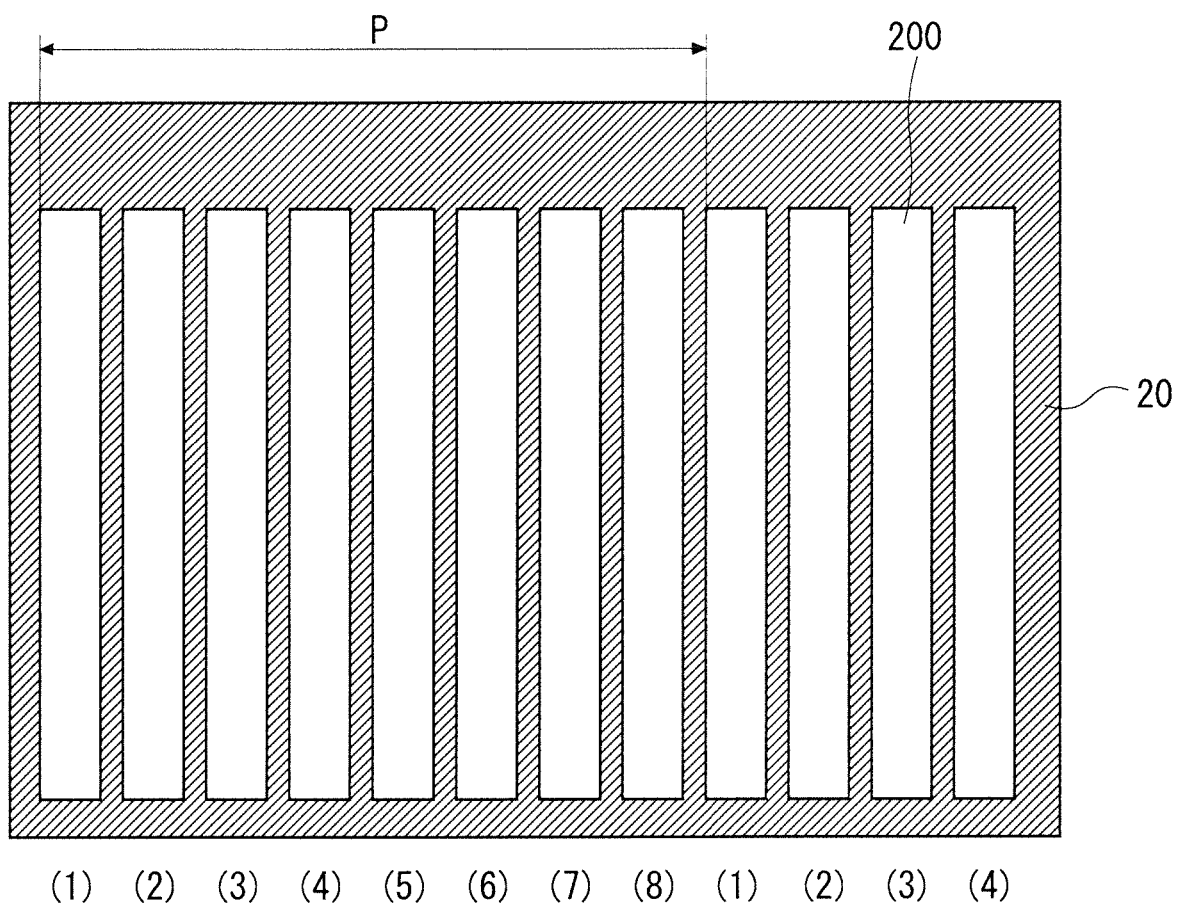

F I G. 4
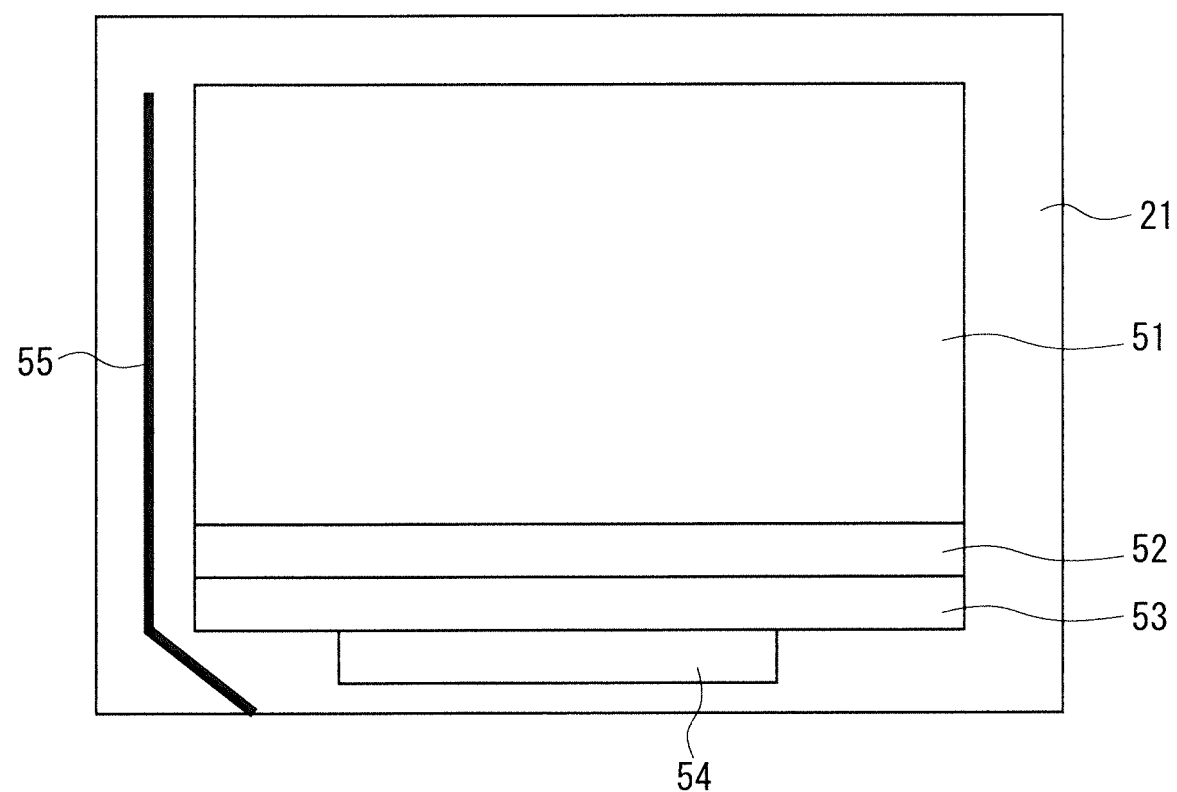

F I G. 5
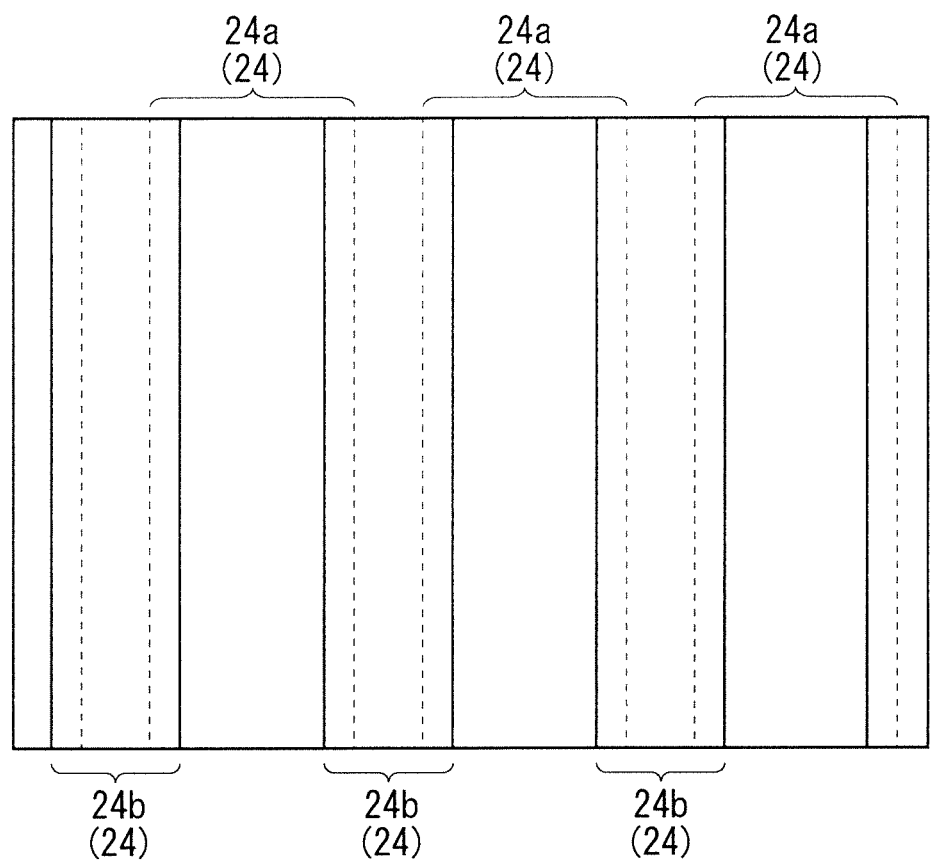
F I G. 6
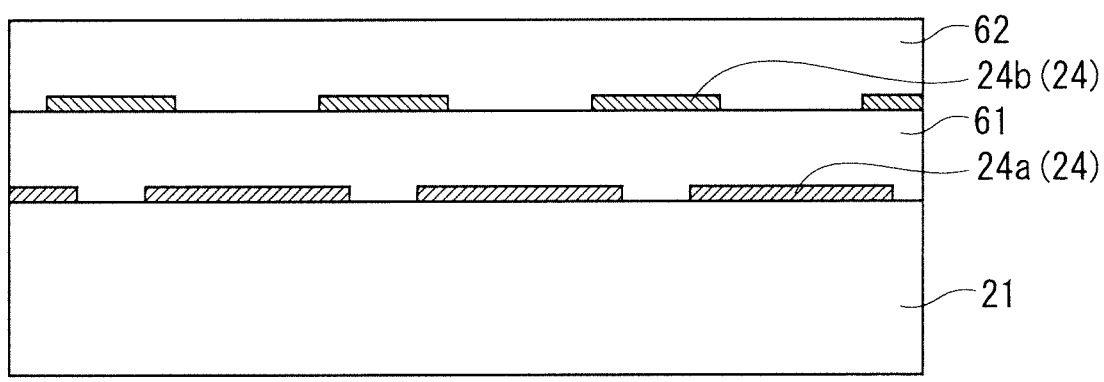

IMAGE DISPLAY APPARATUS

BACKGROUND OF THE INVENTION

Field of the Invention

The present invention relates to parallax-barrier auto-stereoscopic-image display apparatuses or dual-screen display apparatuses.

Description of the Background Art

An auto-stereoscopic-image display apparatus that enables stereoscopic vision without the need for special glasses has been conventionally proposed. For instance, Japanese Patent Application Laid-Open No. 3-119889 discloses a stereoscopic-image display apparatus including the following: barrier generating means generating parallax-barrier stripes by controlling electrons with a transmission display element; and image display means including a display screen spaced away backward from a generation site of the parallax barrier stripes, and capable of displaying, onto the display screen, a multi-directional image having an alternate arrangement of left-image and right-image stripes in conformance with the parallax barrier stripes when displaying a stereoscopic image.

This stereoscopic-image display apparatus electronically generates the barrier stripes and freely controls the shape of the generated barrier stripes (e.g., the number, width, or interval of the stripes), the position (phase) and concentration of the generated barrier stripes, and other things. Such an apparatus consequently serves as a two-dimensional-image display apparatus as well as a stereoscopic-image display apparatus, thereby achieving compatible image display.

Japanese Patent Application Laid-Open No. 2001-166259 discloses an auto-stereoscopic-image display apparatus including the following: image display means that alternately displays a striped left-eye image and a striped right-eye image; light-blocking means that moves the position of a light-blocking portion producing a binocular parallax effect at ¼ pitches of the pitch of the light-blocking-unit; a sensor that detects whether a side-to-side positional movement of an observer's head and the position of the observer's head is either less than or over a suitable vision range; and section-dividing and motion-controlling means that divides the light-blocking means into sections in a side-to-side direction, and controls motion and non-motion of the position of the light-blocking portion of the light-blocking means in each section as divided in accordance with a state where the position of the observer's head is either less than or over the suitable vision range.

Even when the observer's head moves to where deviates from the suitable vision position, the stereoscopic-image display apparatus in Japanese Patent Application Laid-Open No. 2001-166259 provides an observer's right eye with the right-eye image and an observer's left eye with the left-eye image by the movement control of the light-blocking portion and by the display control of the image display means. This allows an observer to identify the stereoscopic image.

The stereoscopic-image display apparatuses in Japanese Patent Application Laid-Open No. 3-119889 and Japanese Patent Application Laid-Open No. 2001-166259 unfortunately cause the observer to notice changes in brightness in the movement control of the light-blocking portion and the display control of the image display means by controlling the electrons in accordance with the motion of the observer's head. Frequent changes resulting from many motions of the observer's head particularly make the observer feel uncomfortable.

To solve this problem, Japanese Patent Application Laid-Open No. 2017-58682 proposes a stereoscopic-image display apparatus that enables continuous vision of the stereoscopic image regardless of an observation distance of the observer and without local brightness variations that are viewed as a bright line and a dark line with respect to observer's motions. The stereoscopic-image display apparatus in Japanese Patent Application Laid-Open No. 2017-58682 includes the following: a display panel including a plurality of sub-pixel pairs arranged widthwise, the sub-pixel pairs each including two sub-pixels displaying respective left-eye and right-eye images; and a parallax-barrier shutter panel including a plurality of sub-openings arranged widthwise, the sub-openings each being changeable between a light transmittance state and a light block state by driving a liquid crystal layer held between two transparent substrates with a transparent electrode extending lengthwise. The sub-openings of the parallax-barrier shutter panel are arranged widthwise at a pitch obtained by dividing, by N (N is an even number equal to or more than four), a reference parallax-barrier pitch determined by a predetermined design observation distance and a pitch of the sub-pixel pair. The parallax-barrier shutter panel is provided with a plurality of common drive areas including widthwise divided display areas. Moreover, N·M+N/2 number of transparent electrodes (M is a positive integer) disposed in the common drive areas are electrically connected to each other for every N transparent electrodes. N/2 transparent electrodes that constitute one group among N transparent electrodes disposed at the end of each common drive area are arranged at the end of the common drive area, and each electrically connected to M different transparent electrodes. Moreover, N/2 transparent electrodes that constitute another group among N transparent electrodes are each electrically connected to M−1 number of different transparent electrodes.

Japanese Patent Application Laid-Open No. 2014-66956 discloses a parallax-barrier shutter panel including a two-layered structure of transparent electrodes extending lengthwise.

In the stereoscopic-image display apparatus in Japanese Patent Application Laid-Open No. 2017-58682, increasing the value N (dividing number) and increasing the number (N·M+N/2) of transparent electrodes, disposed in the common drive area in the parallax-barrier shutter panel, are effective to enhance display performance during a stereoscopic-image display mode. Japanese Patent Application Laid-Open No. 2017-58682 is unfortunately silent about a specific method for increasing the value N.

For instance, let the sub-pixel pair of the display panel have a pitch of 120 µM. The transparent electrode accordingly has a width of 12 µm in N=10, and a width of 8.57 µm in N=4. That is, an increase in the value N requires a reduction in width of the transparent electrode, i.e., a reduction in width of the sub-opening. A narrow width of the transparent electrode would result in difficult processing of metal wires or other things to be connected to the transparent electrodes. The enhancement of the display performance during the stereoscopic-image display mode is hence difficult. This problem is involved also in a reduction in pitch of the sub-pixel in order for the stereoscopic-image display apparatus to have a high resolution or to have a small size.

SUMMARY

It is an object of the present invention to provide an image display apparatus capable of reducing the width of a sub-opening included in a parallax barrier shutter panel.

An image display apparatus according to one aspect of the present invention includes a stacked arrangement of a display panel and a parallax-barrier shutter panel. The display panel includes a plurality of sub-pixel pairs arranged widthwise at a predetermined pitch, the plurality of sub-pixel pairs each being formed of two sub-pixels displaying different images from each other. The parallax-barrier shutter panel includes a plurality of sub-openings arranged widthwise, the plurality of sub-openings each being changeable between a light transmittance state and a light block state by driving a liquid crystal layer held between a first transparent substrate and a second transparent substrate with a transparent electrode extending lengthwise. The first transparent substrate of the parallax-barrier shutter panel includes in a display area, a lower-layer transparent electrode disposed under an interlayer insulating film and an upper-layer transparent electrode disposed on the interlayer insulating film, the lower-layer transparent electrode and the upper-layer transparent electrode being the transparent electrode. The first transparent substrate includes in an area adjacent to the display area, a lower-layer metal wire disposed under the interlayer insulating film and an upper-layer metal wire disposed on the interlayer insulating film. The lower-layer transparent electrode is connected to the lower-layer metal wire.

The transparent electrodes are provided in the form of two separate electrodes: the lower-layer transparent electrode; and the upper-layer transparent electrode. Consequently, the transparent electrodes are arranged to partly overlap each other. This reduces the effective width of each transparent electrode, thereby reducing the width of each sub-opening. In addition, an electrical connection between the lower-layer transparent electrode and the lower-layer metal wire, and an electrical connection between the lower-layer transparent electrode and the upper-layer metal wire are established with no contact hole interposed therebetween. This enables the lower-layer transparent electrode and the upper-layer transparent electrode to have small pitches, thereby further reducing the effective width of the sub-opening.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a plan view of a sub-pixel of a parallax-barrier shutter panel according to the fundamental technique of the present invention;

FIG. 4 is a plan view of an overall configuration of a parallax-barrier shutter panel according to a first preferred embodiment of the present invention;

FIG. 5 is a plan view of a display area of the parallax-barrier shutter panel according to the first preferred embodiment of the present invention;

FIG. 6 is a cross-sectional view of the display area of the parallax-barrier shutter panel according to the first preferred embodiment of the present invention;

DESCRIPTION OF THE PREFERRED EMBODIMENTS

<Fundamental Technique>

Figure 1:
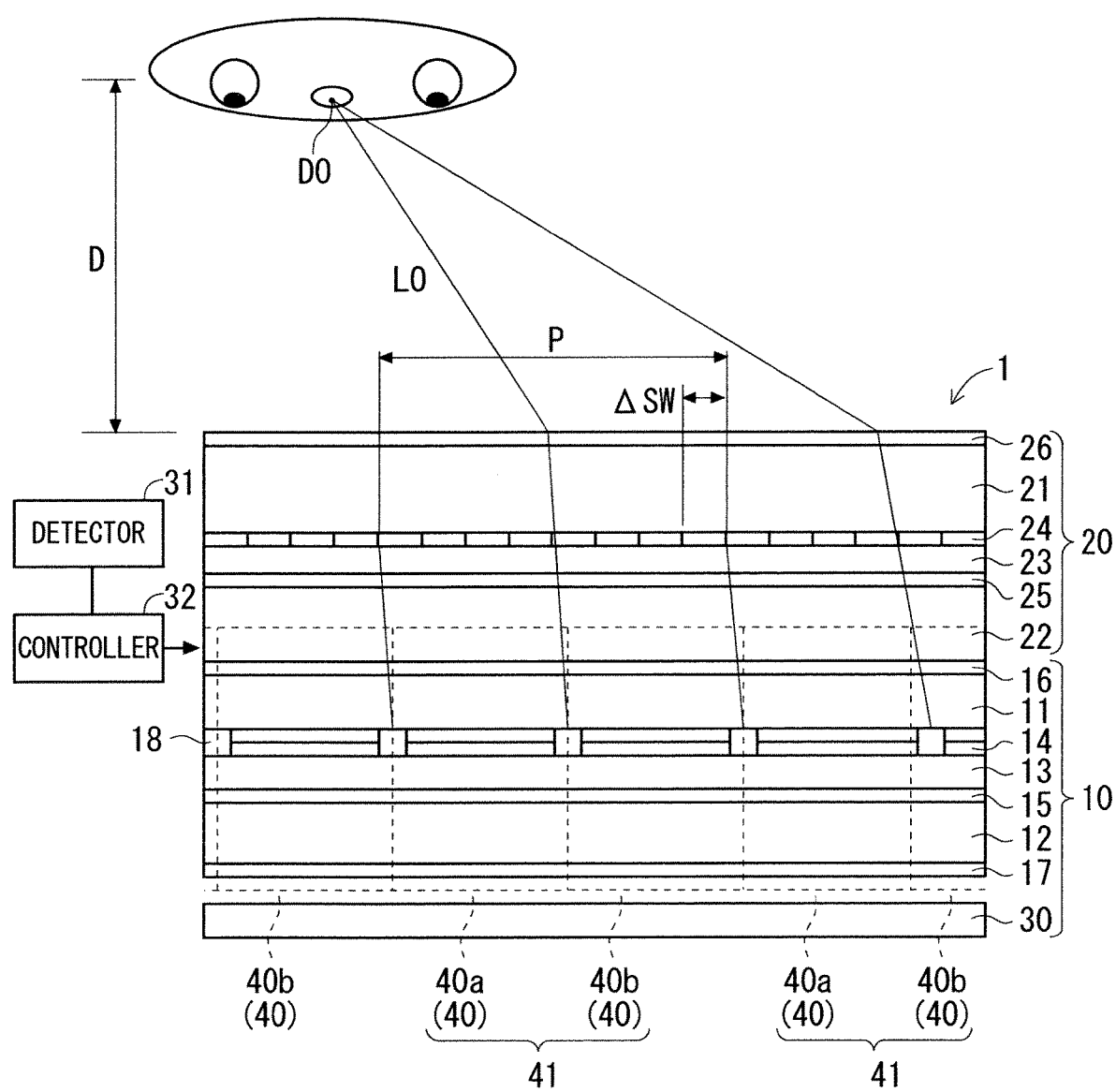
FIG. 1 is a cross-sectional view of a configuration of an image display apparatus according to a fundamental technique of the present invention.

The following describes a technique that is fundamental to the present invention (a fundamental technique). FIG. 1 is a cross-sectional view of a configuration of an image display apparatus 1 according to the fundamental technique of the present invention. The image display apparatus 1 simultaneously displays two images: a right image (a parallax image for an observer's right eye or a first observation-direction image); and a left image (a parallax image for an observer's left eye or a second observation-direction image). The image display apparatus 1 allows an observer to visually identify a stereoscopic image without wearing special glasses, or displays different images in different observation directions. That is, the image display apparatus 1 is available for both an auto-stereoscopic-image display apparatus and a dual-screen display apparatus (dual-view display apparatus). Hereinafter, the image display apparatus 1 serves as the auto-stereoscopic-image display apparatus.

FIG. 1 illustrates a cross-sectional structure of the image display apparatus 1. As illustrated in FIG. 1, connected to the image display apparatus 1 are a detector 31 configured to detect positions (motions) of, for instance, an observer's head and a controller 32 configured to collectively control the image display apparatus 1 and the detector 31 in accordance with a detection result in the detector 31, a video signal, and other things.

It is noted that in the description of the fundamental technique, an up-and-down direction on the drawing sheet of FIG. 1 is referred to as a fore-and-aft direction of the image display apparatus 1; a side-to-side direction on the drawing sheet of FIG. 1, a widthwise direction (side-to-side direction) of the image display apparatus 1; and a depth direction on the drawing sheet of FIG. 1, a lengthwise direction (up-and-down direction) of the image display apparatus 1.

As illustrated in FIG. 1, the image display apparatus 1 includes a display panel 10 and a parallax-barrier shutter panel 20 (optical inductor) disposed at the front of the display panel 10 (in the upper part of FIG. 1).

The display panel 10 is a matrix display panel, such as an organic EL panel, a plasma display apparatus, or a liquid crystal display. It is noted that the parallax-barrier shutter panel 20 may be disposed at the back of the display panel 10 (in the lower part of FIG. 1) in a liquid crystal display serving as the display panel 10.

FIG. 1 illustrates the display panel 10 serving as a liquid crystal display. The display panel 10 includes two transparent substrates 11 and 12, and liquid crystal layers 13 held between the transparent substrates 11 and 12. The transparent substrate 11, located forward, is provided with sub-pixel transparent electrodes 14. The sub-pixel transparent electrodes 14 are in the form of strips (lengthwise strips) elongated lengthwise (in a depth direction in FIG. 1). The transparent substrate 12, located backward, is provided with a counter transparent electrode 15. The counter transparent electrode 15 is disposed all over the surface of the transparent electrode 12. The liquid crystal layers 13 are driven by the sub-pixel transparent electrodes 14 and the counter transparent electrode 15, which sandwich the liquid crystal layers 13.

The transparent substrate 11 is provided with an intermediate polarizing plate 16 at its front. The transparent substrate 12 is provided with a back-side polarizing plate 17 at its back. Disposed behind the back-side polarizing plate 17 is a backlight 30. The transparent substrates 11 and 12 have surfaces adjacent to the liquid crystal layer 13, the surfaces being provided with alignment films, which are not shown, aligning the liquid crystal layers 13 in a certain direction.

The display panel 10 may be configured in any manner other than the configuration illustrated in FIG. 1. For instance, the sub-pixel transparent electrodes 14, although disposed in front of the counter transparent electrode 15 in FIG. 1, may be disposed behind the counter transparent electrode 15.

The display panel 10 is provided with a plurality of sub-pixels 40. The sub-pixels 40 displaying a right image is hereinafter referred to as sub-pixels 40a. Moreover, the sub-pixels 40 displaying a left image is hereinafter referred to as sub-pixels 40b. The sub-pixels 40a and the sub-pixels 40b are alternately arranged widthwise (in a side-to-side direction in FIG. 1). A light-blocking wall 18 is disposed between each sub-pixel 40a and each sub-pixel 40b. In other words, each of the sub-pixels 40a and 40b is sandwiched between the light-blocking walls 18.

The sub-pixels 40a and 40b have the same width or almost the same width. Here, a pair of sub-pixels 40a and 40b adjacent to each other constitutes a sub-pixel pair 41 displaying two different images for right and left (the right image and the left image). The sub-pixel pairs 41 are arranged widthwise in the display panel 10 at a regular pitch. Further, the sub-pixel pairs 41 are arranged not only widthwise, but also lengthwise.

In the image display apparatus 1 in FIG. 1, defined is a reference parallax-barrier pitch P that is a widthwise reference pitch corresponding to the widthwise width of the sub-pixel pair 41. The reference parallax-barrier pitch P is set so that an imaginary light beam LO that is emitted from the center of the light-blocking wall 18 between the sub-pixel 40a and the sub-pixel 40b, which constitute the sub-pixel pair 41, and then passes through the center of the reference parallax-barrier pitch P corresponding to the sub-pixel pair 41 converges at a design visual-identification point DO that is remote forward from the image display apparatus 1 by a design observation distance D. It is noted that the Specification regards the reference parallax-barrier pitch P as the sum of the width of the sub-pixel 40a and the width of the sub-pixel 40b for simple description. The optimization of the design observation distance D, which does not need to be described, will not be elaborated upon here.

The parallax-barrier shutter panel 20 includes two transparent substrates 21 and 22, and liquid crystal layers 23 held between the transparent substrates 21 and 22. The transparent substrate 21, located forward, is hereinafter referred to as a first transparent substrate 21. Moreover, the transparent substrate 22, located backward, is hereinafter referred to as a second transparent substrate 22.

The first transparent substrate 21 has a surface adjacent to the liquid crystal layers 23, the surface being provided with a plurality of first transparent electrodes 24 extending lengthwise in the form of strips. Each first transparent electrode 24 corresponds to one piece of a transparent electrode as divided into an even number of pieces (herein eight pieces), the transparent electrode being disposed within the reference parallax-barrier pitch P of the sub-pixel pair 41. That is, an even number of first transparent electrodes 24 (herein eight first transparent electrodes 24) are arranged within the reference parallax-barrier pitch P. It is noted that the first transparent electrodes 24 are electrically insulated from each other unless otherwise mentioned.

The second transparent substrate 22 has a surface adjacent to the liquid crystal layers 23, the surface being provided with a second transparent electrode 25 extending widthwise. A plurality of transparent electrodes 25 can be arranged lengthwise (in a depth direction of the drawing sheet in FIG. 1) at a lengthwise pitch of the sub-pixel pair 41. Alternatively, a single transparent electrode 25 can be disposed all over the surface of the second transparent substrate 22. Here, the second transparent electrode 25 is disposed all over the surface of the second transparent substrate 22.

The first transparent electrodes 24 and the second transparent electrode 25 apply an electric field to drive each liquid crystal layer 23. The liquid crystal layer 23 is driven in a mode, such as a twisted nematic (TN) mode, a super twisted nematic (STN) mode, an in-plane switching mode, or an optically compensated bend (OCB) mode.

The first transparent substrate 21 is provided with a display-surface polarizing plate 26 at its front. Moreover, the second transparent substrate 22 is provided with a polarizing plate at its back. Herein, the intermediate polarizing plate 16 of the display panel 10 also functions as the polarizing plate of the second transparent substrate 22. The first transparent substrate 21, although disposed in front of the second transparent substrate 22 in FIG. 1, may be disposed behind the second transparent substrate 22.

Each of the first transparent electrode 24 and the second transparent electrode 25 selectively receives a voltage. Thus, the parallax-barrier shutter panel 20 is changeable between a light transmittance state and a light block state in a width unit of the first transparent electrode 24. In the following description, an optical opening in the parallax-barrier shutter panel 20, the optical opening being changeable, by electrical control, between the light transmittance state and the light block state in the width unit of the first transparent electrode 24 is referred to as a sub-opening.

The sub-opening is formed in a position corresponding to each first transparent electrode 24. The parallax-barrier shutter panel 20 of the image display apparatus 1 in FIG. 1 has eight first transparent electrodes 24 arranged widthwise within the reference parallax-barrier pitch P. Thus, eight sub-openings 200 are arranged widthwise within the reference parallax-barrier pitch P, as illustrated in FIG. 2.

Figure 3:
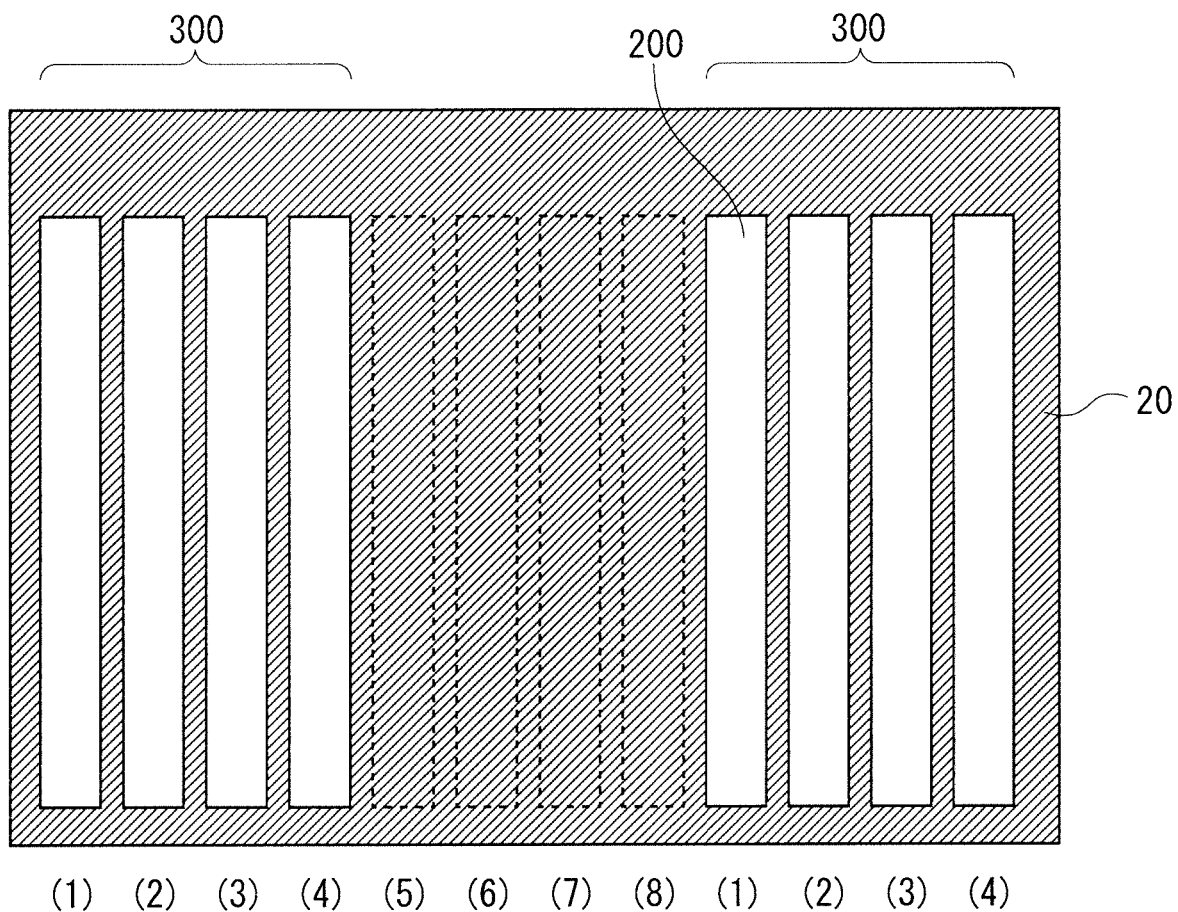
FIG. 3 is a plan view of a general opening of the parallax-barrier shutter panel according to the fundamental technique of the present invention.

Although all the sub-openings 200 are in the light transmittance state (open state) in FIG. 2, each sub-opening 200 is changeable between the light transmittance state and the light block state by regulating the voltage across the first transparent electrode 24. For instance, FIG. 3 illustrates that half (four in total, indicated by numerals (5) to (8)) of the plurality of sub-openings 200 (eight in total, indicated by numerals (1) to (8)) within the reference parallax-barrier pitch P are in the light block state. Hereinafter, a group of sub-openings 200 in the light transmittance state within the reference parallax-barrier pitch P is referred to as a general opening 300. The general opening 300 (the sub-openings 200 in the light transmittance state) guides light emitted from the sub-pixel 40b for the left image and light emitted from the sub-pixel 40a for the right image in different directions from each other. Although FIG. 3 illustrates that the left half of the reference parallax-barrier pitch P has the general opening 300 consisting of four sub-openings 200 in the light transmittance state, the position of the general opening 300 varies by changing the sub-openings 200 to be placed into the light transmittance state.

The following briefly describes the operation of the image display apparatus 1. The detector 31, connected to the image display apparatus 1, detects observer's positions (motions). The controller 32 controls the state (light transmittance state/light block state) of each sub-opening 200 of the parallax-barrier shutter panel 20 in accordance with the detection result in the detector 31 to control the position of the general opening 300. That is, the controller 32 widthwise moves the general opening 300 in conformance with a rightward movement of the observer's position or a leftward movement of the observer's position. This allows the observer to continuously see a stereoscopic image even when the observer moves in a side-to-side direction.

In the image display apparatus 1, an increase in number of the sub-openings 200 disposed within the reference parallax-barrier pitch P enables a position in which the stereoscopic image is displayed to be controlled in detail. To achieve such control, a large number of first transparent electrodes 24 need to be disposed within the reference parallax-barrier pitch P. Hence, each first transparent electrode 24 is required to have a narrow width.

First Preferred Embodiment

Although an image display apparatus 1 according to the present invention has an overall configuration similar to the configuration in FIG. 1, the present invention features a structure of a first transparent substrate 21 of a parallax-barrier shutter panel 20. Accordingly, a first preferred embodiment particularly describes a configuration of the first transparent substrate. A second transparent substrate 22 is configured in the same manner as the corresponding substrate in the fundamental technique. Here, a second transparent electrode 25 is disposed all over the surface of the second transparent substrate 22.

In the present preferred embodiment, six sub-openings 200 i.e., six first transparent electrodes 24 are disposed within a reference parallax-barrier pitch P. It is noted that the number of sub-openings 200 to be disposed within the reference parallax-barrier pitch P is not limited to six, and that a plurality of sub-openings 200 are required to be provided.

FIG. 4 is a plan view of an overall configuration of the first transparent substrate 21 of the parallax-barrier shutter panel 20. A display area 51 is defined at the center of the first transparent substrate 21. The first transparent electrodes 24 in the form of strips forming the sub-openings 200 are disposed within the display area 51.

Provided is a conversion section 52 that is a region for converting the first transparent substrate 21 into a metal wire (region for connecting the metal wire to the first transparent substrate 21) so as to be adjacent to the display area 51. Moreover, disposed outside the conversion section 52 is a wiring section 53 that is a region for connecting the metal wire, connected to the first transparent substrate 21, to a drive integrated circuit (IC) 54. That is, the first transparent electrodes 24 are each electrically connected to the drive IC 54 through the metal wire. This enables a signal (voltage) output by the drive IC 54 to be applied across the first transparent electrode 24 within the display area 51. It is noted that the drive IC 54 receives a signal for controlling a position of a general opening 300 from the outside (e.g., from the controller 32 illustrated in FIG. 1).

Disposed outside the display area 51 is a counter-substrate connection electrode 55 for supplying the voltage to the second transparent electrode 25 of the second transparent substrate 22 when the first transparent substrate 21 is provided to face the second transparent substrate 22. This enables a given voltage to be applied between the second transparent electrode 25 and each of the first transparent electrodes 24, thereby controlling the states (light transmittance state/light block state) of each sub-opening 200. Although disposed on only one side of the first transparent substrate 21 in FIG. 4, the counter-substrate connection electrode 55 may be more widely provided. Further, only part of the counter-substrate connection electrode 55 may be electrically connected to the second transparent electrode 25.

FIG. 5 is an enlarged plan view of part of the display area 51 of the first transparent substrate 21. FIG. 6 is a cross-sectional view of a region illustrated in FIG. 5 in a side-to-side direction. As illustrated in FIGS. 5 and 6, the plurality of first transparent electrodes 24 are disposed on the first transparent substrate 21 in the form of two separate layers. That is, the parallax-barrier shutter panel 20 in the first preferred embodiment includes the first transparent electrodes 24 formed of lower-layer transparent electrodes 24a and upper-layer transparent electrodes 24b, each lower-layer transparent electrode 24a and each upper-layer transparent electrode 24b being formed in different layers from each other.

The lower-layer transparent electrode 24a is disposed on the first transparent substrate 21. Disposed on the lower-layer transparent electrode 24a is an interlayer insulating film 61. The upper-layer transparent electrode 24b is disposed on the interlayer insulating film 61. Disposed on the upper-layer transparent electrode 24b is a protective insulating film 62. In this way, the lower-layer transparent electrode 24a is disposed under the interlayer insulating film 61; in addition, the upper-layer transparent electrode 24b is disposed on the interlayer insulating film 61. It is noted that the protective insulating film 62 on the upper-layer transparent electrode 24b may be omitted.

The first transparent substrate 21 has an uppermost layer (a surface adjacent to liquid crystal layers 23) provided with an alignment film, which is not shown. Further, the second transparent substrate 22 has an uppermost layer provided with an alignment film, which is not shown.

In FIGS. 5 and 6, the end of the lower-layer transparent electrode 24a and the end of the upper-layer transparent electrode 24b overlap each other; thus, there is no gap between the lower-layer transparent electrode 24a and the upper-layer transparent electrode 24b in plan view. Consequently, the parallax-barrier shutter panel 20 has no gap between the sub-openings 200. The lower-layer transparent electrode 24a and the upper-layer transparent electrode 24b, when having narrow widths, may be provided so as not to overlap each other.

The sub-opening 200 controlled by the lower-layer transparent electrode 24a preferably has the same width as the sub-opening 200 controlled by the upper-layer transparent electrode 24b. Accordingly, the liquid crystal layer 23 driven by the lower-layer transparent electrode 24a is required to have the same width as the liquid crystal layer 23 driven by the upper-layer transparent electrode 24b. The width of a range in which an electric field is generated between the lower-layer transparent electrode 24a and the second transparent electrode 25 depends on an interval between the upper-layer transparent electrodes 24b. Moreover, the distance from the second transparent electrode 25 to the lower-layer transparent electrode 24a is longer than the distance from the second transparent electrode 25 to the upper-layer transparent electrode 24b. Hence, a slightly smaller width of the upper-layer transparent electrode 24b than the interval between the upper-layer transparent electrodes 24b enables the liquid crystal layer 23 driven by the lower-layer transparent electrode 24a to have almost the same width as the liquid crystal layer 23 driven by the upper-layer transparent electrode 24b.

As described above, the first transparent electrodes 24 are arranged in the form of two separate layers: the lower-layer transparent electrodes 24a; and the upper-layer transparent electrodes 24b. Consequently, the first transparent electrodes 24 are arranged to partly overlap each other. This reduces the effective width of each first transparent electrode 24, thereby reducing the width of each sub-opening 200.

Figure 7:
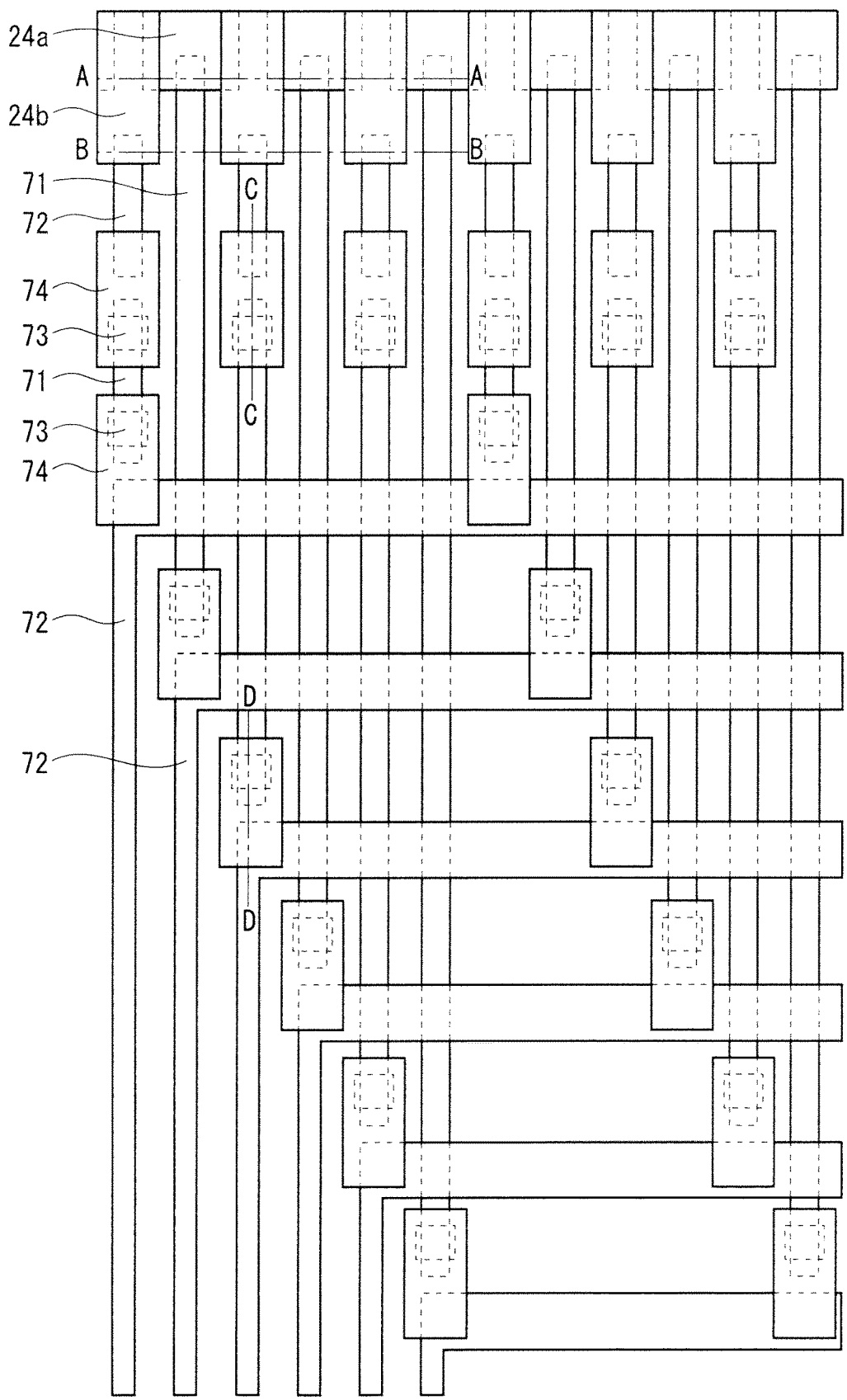
FIG. 7 is a plan view of a conversion section of the parallax-barrier shutter panel according to the first preferred embodiment of the present invention.

The following describes a structure of the conversion section 52 of the first transparent substrate 21. FIG. 7 is an enlarged plan view of part of the conversion section 52. Moreover, FIGS. 8, 9, 10, and 11 are respectively cross-sectional views taken along line A-A, line B-B, line C-C, and line D-D in FIG. 7. It is noted that the upper part of the drawing sheet of FIG. 7 communicates with the display area 51.

Figure 8:
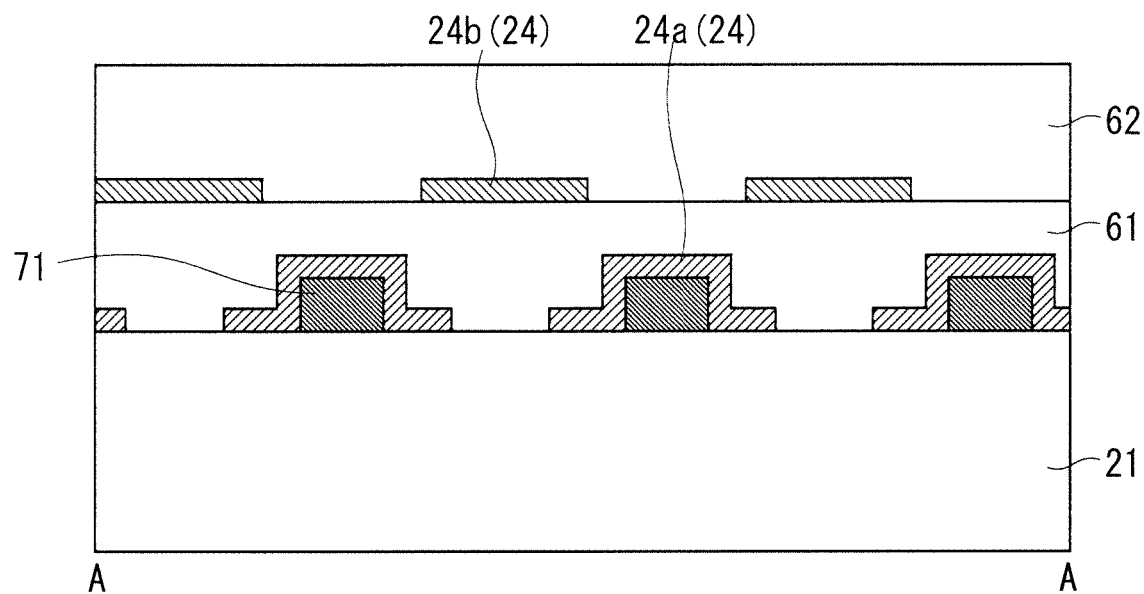
FIG. 8 is a cross-sectional view (cross-sectional view taken along line A-A in FIG. 7) of the conversion section of the parallax-barrier shutter panel according to the first preferred embodiment of the present invention.

As illustrated in FIGS. 7 and 8, the lower-layer transparent electrodes 24a drawn from the display area 51 to the conversion section 52 are connected to lower-layer metal wires 71 formed on the first transparent substrate 21 (under the interlayer insulating film 61) in the conversion section 52. As illustrated in FIG. 8, each lower-layer transparent electrode 24a is directly connected to the lower-layer metal wire 71 with no contact hole interposed therebetween.

Figure 9:
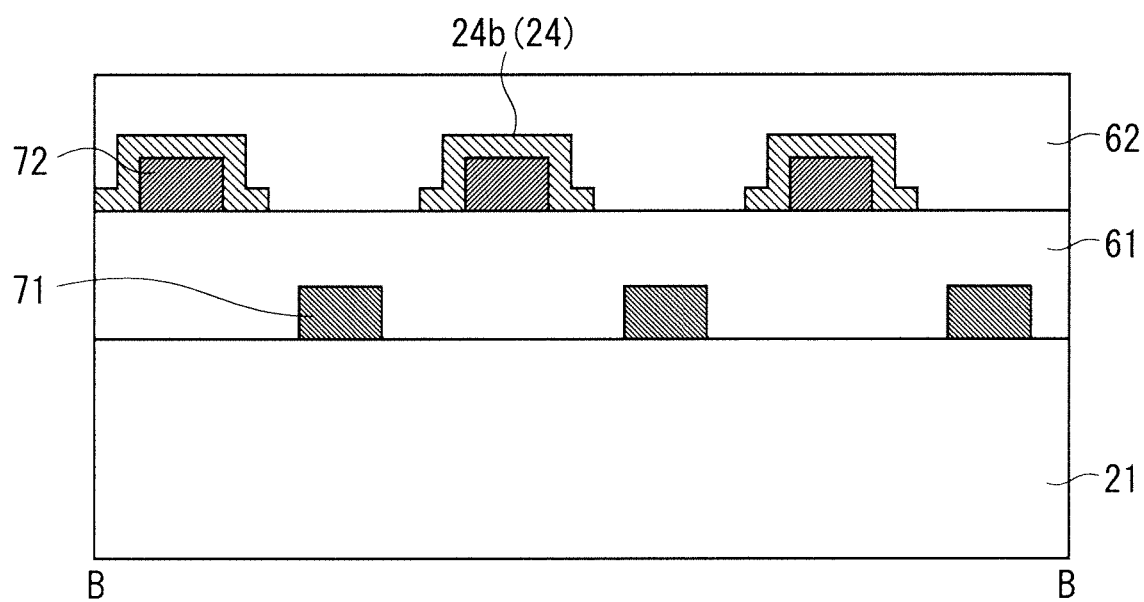
FIG. 9 is a cross-sectional view (cross-sectional view taken along line B-B in FIG. 7) of the conversion section of the parallax-barrier shutter panel according to the first preferred embodiment of the present invention.

As illustrated in FIGS. 7 and 9, the upper-layer transparent electrodes 24b drawn from the display area 51 to the conversion section 52 are connected to upper-layer metal wires 72 formed on the interlayer insulating film 61 in the conversion section 52. As illustrated in FIG. 9, each upper-layer transparent electrode 24b is directly connected to the upper-layer metal wire 72 with no contact hole interposed therebetween.

In this way, no contact hole is provided for establishing an electrical connection between the lower-layer transparent electrode 24a and the lower-layer metal wire 71, and an electrical connection between the upper-layer transparent electrode 24b and the upper-layer metal wire 72. A contact hole can be provided for establishing each electrical connection. The contact hole accordingly needs to allocate a formation region having a wide horizontal width in conformance with the size accuracy of the contact hole and the alignment accuracy of each layer. As a result, the lower-layer transparent electrode 24a and the upper-layer transparent electrode 24b are difficult to have small pitches. This can cause the conversion section 52 to have a wide widthwise width. Moreover, the formation regions of the contact holes can be arranged in an alternate manner (staggered manner) in an up-and-down direction. Accordingly, the widthwise width of the conversion section 52 does not increase, but the conversion section 52 unfortunately has a wide lengthwise width.

In the present preferred embodiment, no contact hole is provided for establishing the connection between the lower-layer transparent electrode 24a and the lower-layer metal wire 71, and establishing the connection between the upper-layer transparent electrode 24b and the upper-layer metal wire 72. This enables the lower-layer transparent electrode 24a and the upper-layer transparent electrode 24b to have small pitches, thereby achieving the downsizing of the image display apparatus 1, and improving design flexibility. In addition, such direct connections achieve a smaller electrical resistance than connections via contact holes, thereby reducing power consumption.

The following describes one example of the widths and intervals of the lower-layer transparent electrode 24a, the upper-layer transparent electrode 24b, the lower-layer metal wire 71, and the upper-layer metal wire 72. For instance, the upper-layer transparent electrode 24b can have a width of 8.4 μm and an interval of 8.6 μm; the upper-layer metal wire 72, a width of 4.0 μm; the lower-layer transparent electrode 24a, a width of 12.4 μm; and the lower-layer metal wire 71, a width of 4.0 μm. Here, let fourteen common drive electrodes (fourteen first transparent electrodes 24 within the reference parallax-barrier pitch P) be provided. The reference parallax-barrier pitch P is accordingly 119 μm. Thus, a lot of common drive electrodes are successfully provided even in a small reference parallax-barrier pitch P.

Figure 10:
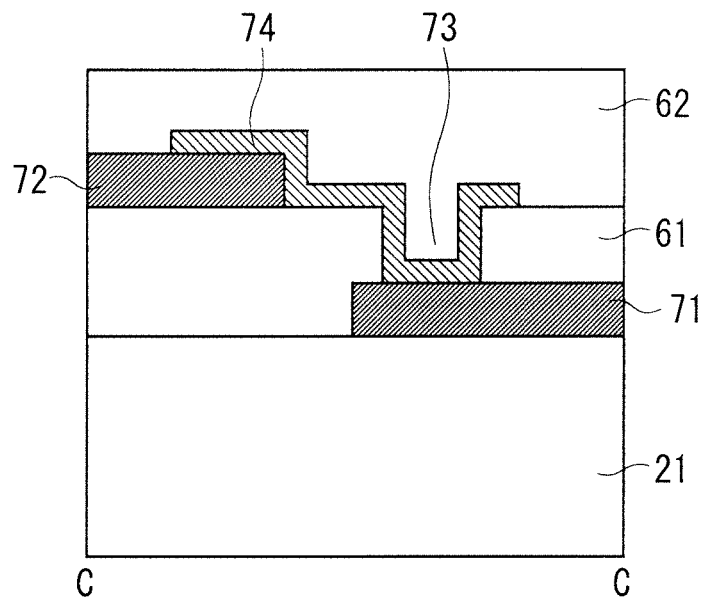
FIG. 10 is a cross-sectional view (cross-sectional view taken along line C-C in FIG. 7) of the conversion section of the parallax-barrier shutter panel according to the first preferred embodiment of the present invention.
Figure 11:
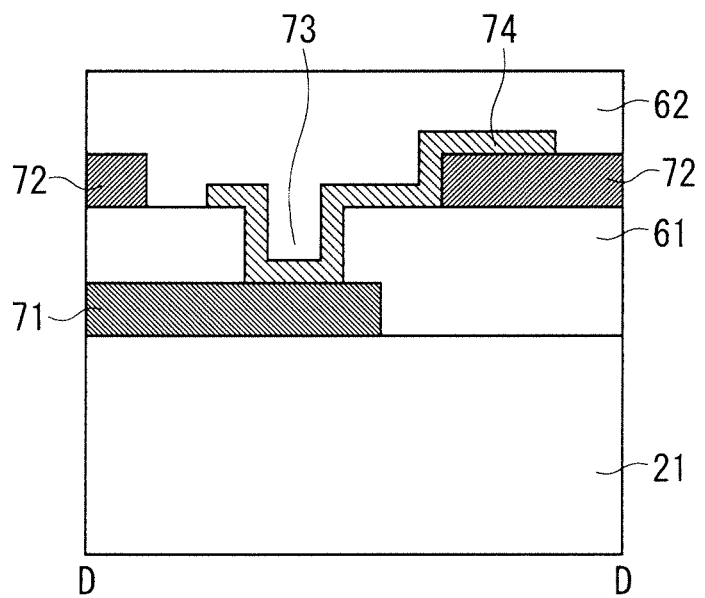
FIG. 11 is a cross-sectional view (cross-sectional view taken along line D-D in FIG. 7) of the conversion section of the parallax-barrier shutter panel according to the first preferred embodiment of the present invention.

Meanwhile, as illustrated in FIGS. 10 and 11, a connection between the lower-layer metal wire 71 and the upper-layer metal wire 72 is established through a contact hole 73 formed in the interlayer insulating film 61. To be specific, the contact hole 73 is formed in the interlayer insulating film 61 to reach the upper surface of the lower-layer metal wire 71. Then, provided is a connection wire 74 so as to be connected to both the upper-layer metal wire 72 and the lower-layer metal wire 71 exposed to the contact hole 73, the connection wire 74 being formed of a transparent conductive film in the same layer as the upper-layer transparent electrode 24b. This establishes an electrical connection between the lower-layer metal wire 71 and the upper-layer metal wire 72. It is noted that the upper-layer metal wire 72 and the connection wire 74 are directly connected to each other with no contact hole interposed therebetween.

In the first preferred embodiment, six first transparent electrodes 24 (the lower-layer transparent electrodes 24a and the upper-layer transparent electrodes 24b) are disposed within the reference parallax-barrier pitch P, and the first transparent electrodes 24 are driven in common (electrical common) for every six electrodes. As illustrated in FIG. 7, the lower-layer transparent electrodes 24a which are in electrical common and the upper-layer transparent electrodes 24b which are in electrical common are electrically connected, in common, to the upper-layer metal wire 72 extending in a side-to-side direction.

The upper-layer metal wire 72, electrically connected to the lower-layer transparent electrode 24a or the upper-layer transparent electrode 24b, extends to the wiring section 53 disposed in the lower part of the drawing sheet of FIG. 7, and is connected to the drive IC 54 in the wiring section 53. Alternatively, the upper-layer metal wire 72 may be converted into the lower-layer metal wire 71 using a configuration similar to that in FIG. 10 or FIG. 11, and then be drawn to the wiring section 53 to connect the lower-layer metal wire 71 to the drive IC 54.

Figure 12:
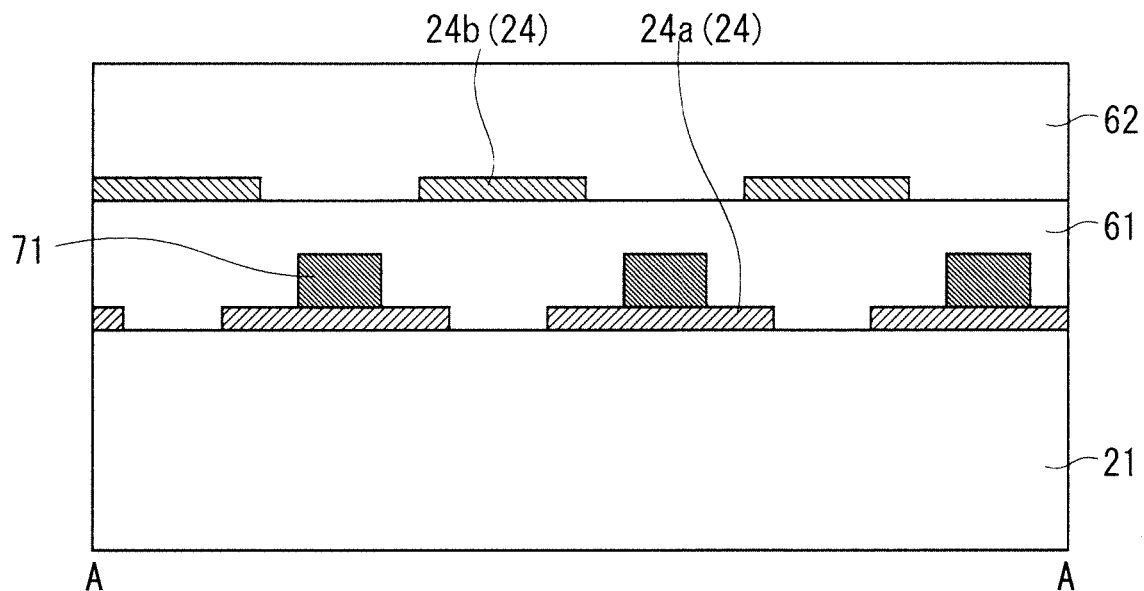
FIG. 12 is a cross-sectional view (cross-sectional view taken along line A-A in FIG. 7) of a modified conversion section of the parallax-barrier shutter panel according to the first preferred embodiment of the present invention.
Figure 13:
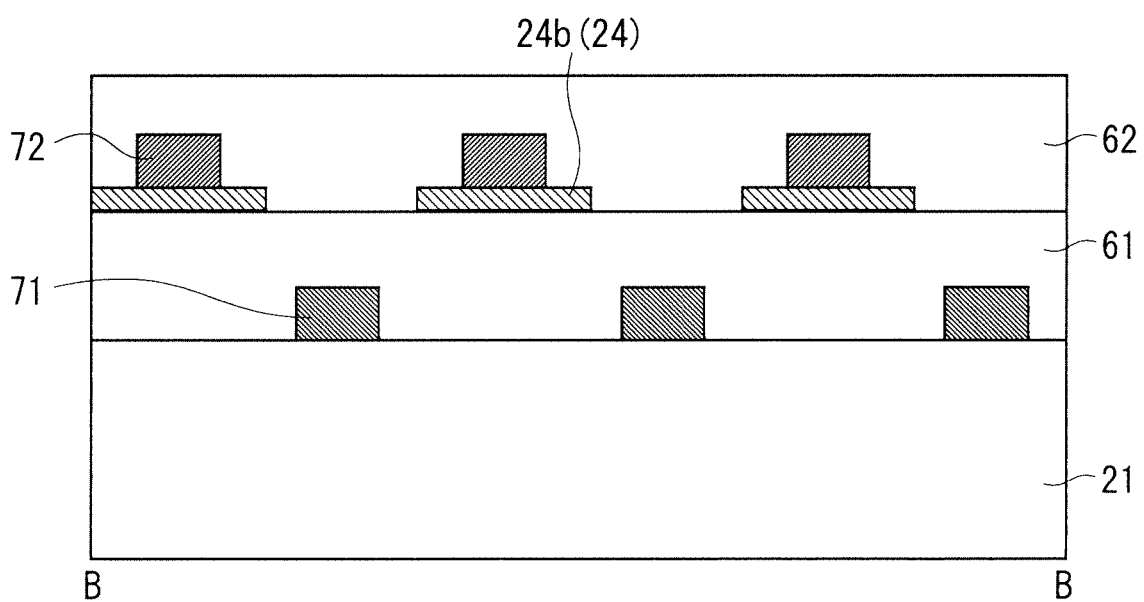
FIG. 13 is a cross-sectional view (cross-sectional view taken along line B-B in FIG. 7) of the modified conversion section of the parallax-barrier shutter panel according to the first preferred embodiment of the present invention.

It is noted although FIG. 8 illustrates the lower-layer transparent electrodes 24a arranged on the lower-layer metal wires 71, this arrangement may be reversed. It is also noted that although FIG. 9 illustrates the upper-layer transparent electrodes 24b arranged on the upper-layer metal wires 72, this arrangement may be reversed. That is, the lower-layer transparent electrodes 24a may be arranged under the lower-layer metal wires 71, as illustrated in FIG. 12. Moreover, the upper-layer transparent electrodes 24b may be arranged under the upper-layer metal wires 72, as illustrated in FIG. 13. It is also noted that FIG. 12 corresponds to a cross-section taken along line A-A in FIG. 7, in a manner similar to FIG. 8; and FIG. 13, to a cross-section taken along line B-B in FIG. 7 in a manner similar to FIG. 9.

For a structure illustrated in FIG. 13, the connection wire 74 is disposed under the upper-layer metal wire 72 in cross-sections corresponding to FIGS. 10 and 11 (cross-sections taken along line C-C and line D-D), the illustration of which is omitted.

The lower-layer transparent electrode 24a and the upper-layer transparent electrode 24b are made of an optically transparent and conductive material. Non-limiting examples of such a material include indium zinc oxide (IZO) and indium tin oxide (ITO).

The lower-layer metal wire 71 and the upper-layer metal wire 72 are made of a material that is conductive but is not necessarily transparent. Such a material preferably has a higher conductivity than the material of the lower-layer transparent electrode 24a and upper-layer transparent electrode 24b. A non-limiting example of such a material is a metal, such as Al, Cu, Ni, Ag, Nd, Mo, Nb, W, Ta, or Ti.

The interlayer insulating film 61 and the protective insulating film 62 are made of a transparent and electrically insulating material. Non-limiting examples of such a material include a SiN film, a SiO film, an inorganic insulating film such as a laminated film containing SiN and SiO, and an organic insulating film primarily made of an optically transparent, acrylic material.

Second Preferred Embodiment

Figure 14:
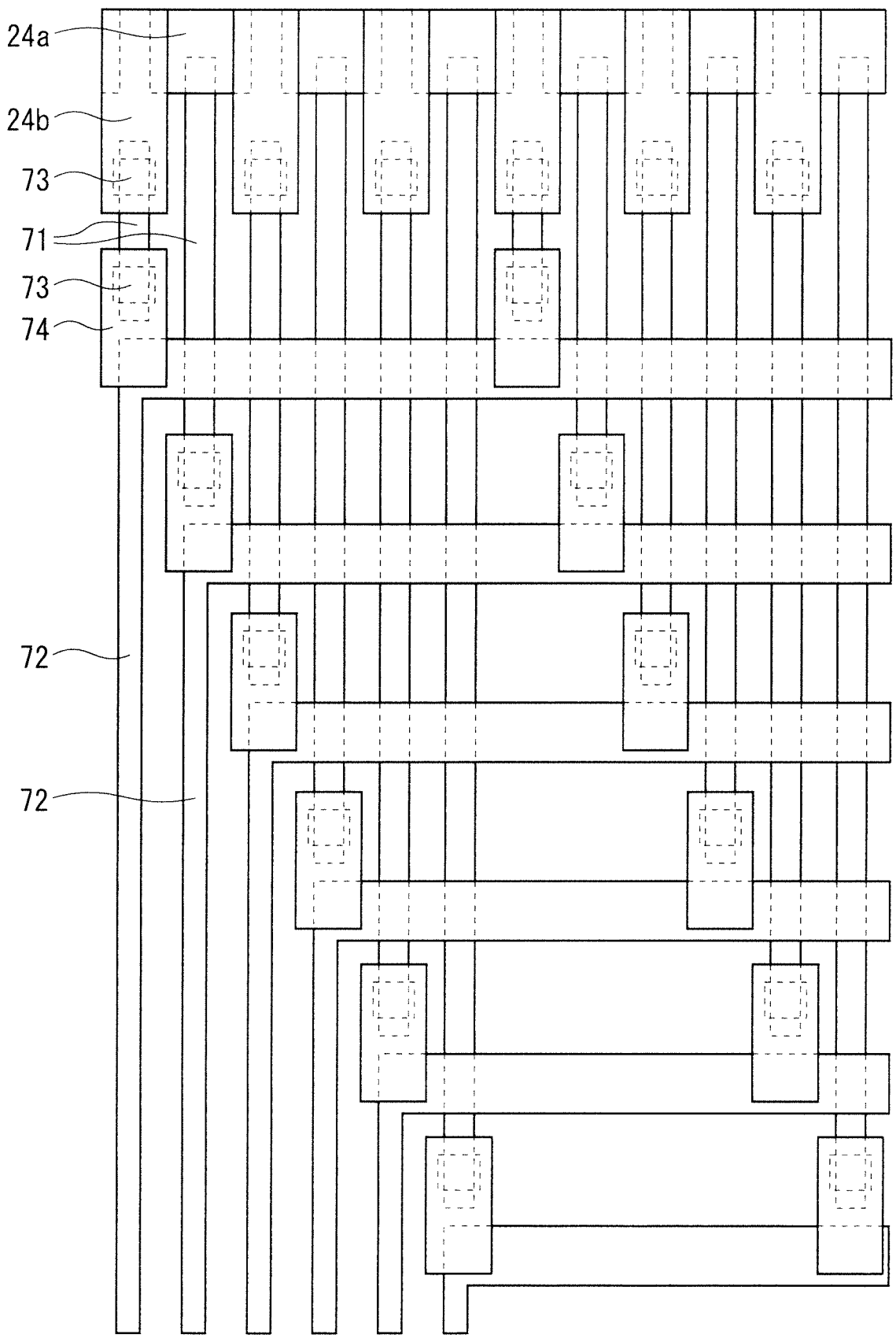
FIG. 14 is a plan view of a conversion section of a parallax-barrier shutter panel according to a second preferred embodiment of the present invention.

FIG. 14 is an enlarged plan view of part of a conversion section 52 of a first transparent substrate 21 included in a parallax-barrier shutter panel 20 according to a second preferred embodiment.

The conversion section 52 (FIG. 7) in the first preferred embodiment is configured such that the upper-layer transparent electrodes 24b are directly connected to the upper-layer metal wires 72, that the upper-layer metal wires 72 are connected to the lower-layer metal wires 71 via the contact holes 73, and that the lower-layer metal wires 71 are connected, via the contact holes 73, to the upper-layer metal wires 72 extending in a side-to-side direction.

In contrast to this configuration, the conversion section 52 in the second preferred embodiment is configured such that, as illustrated in FIG. 14, upper-layer transparent electrodes 24b are connected to lower-layer metal wires 71 with no upper-layer metal wire 72 interposed therebetween via contact holes 73, and that the lower-layer metal wires 71 are connected, via the contact hole 73, to the upper-layer metal wires 72 extending in a side-to-side direction. That is, in the second preferred embodiment, each upper-layer transparent electrode 24b is not directly connected to the upper-layer metal wire 72, but is electrically connected to the upper-layer metal wire 72 through the lower-layer metal wire 71.

The upper-layer metal wire 72 directly connected to the upper-layer transparent electrode 24b is omitted in the configuration in FIG. 14, as contradistinguished from the configuration in FIG. 7. This enables the conversion section 52 to have a narrow width (a short length in an up-and-down direction).

Third Preferred Embodiment

Figure 15:
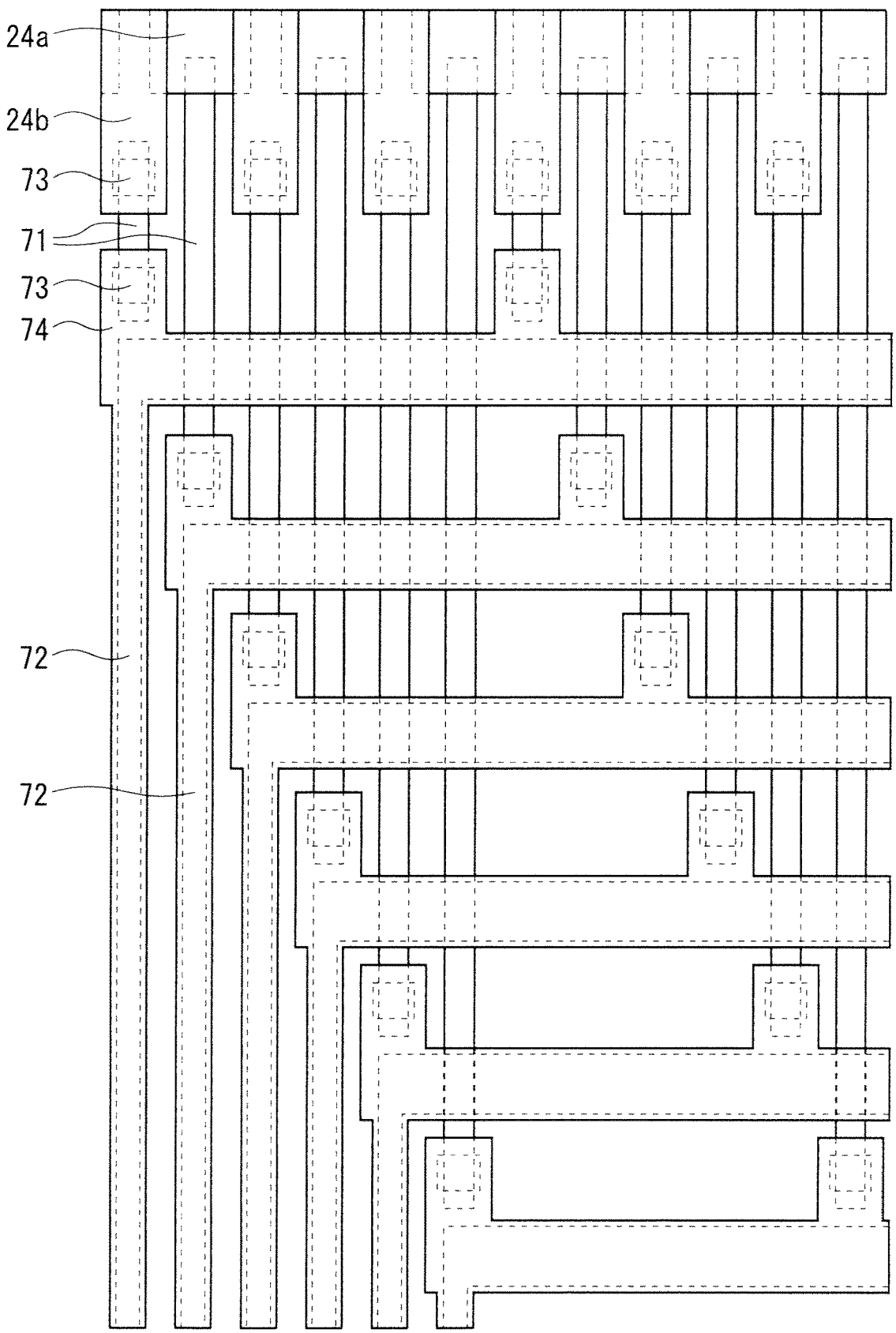
FIG. 15 is a plan view of a conversion section of a parallax-barrier shutter panel according to a third preferred embodiment of the present invention.

FIG. 15 is an enlarged plan view of part of a conversion section 52 of a first transparent substrate 21 included in a parallax-barrier shutter panel 20 according to a third preferred embodiment.

In the third preferred embodiment, the upper surface of each upper-layer metal wire 72 is covered in whole with a transparent conductive film (a connection wire 74) in the same layer as an upper-layer transparent electrode 24b, as illustrated in FIG. 15. Although the illustration in FIG. 15, in which the connection wire 74 is disposed all over the upper surface of the upper-layer metal wire 72, is applied to the configuration in FIG. 14, the illustration may be applied to the configuration in FIG. 7.

As earlier mentioned in the first preferred embodiment, a protective insulating film 62, disposed on the upper-layer transparent electrode 24b and the upper-layer metal wire 72, may be omitted. The upper-layer transparent electrode 24b and the upper-layer metal wire 72 are disposed in an uppermost layer in a configuration without the protective insulating film 62. A large difference in oxidation-reduction potential between a material of the upper-layer transparent electrode 24b and a material of the upper-layer metal wire 72 can unfortunately cause a cell reaction between the upper-layer transparent electrode 24b and the upper-layer metal wire 72, thereby involving a malfunction such as erosion. This problem is avoidable regardless of a material of the upper-layer metal wire 72 by covering in whole the upper surface of the upper-layer metal wire 72 with the transparent conductive film formed in the same layer as the upper-layer transparent electrode 24b, as illustrated in FIG. 15.

It is noted that in the present invention, the individual embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:
1. An image display apparatus comprising a stacked arrangement of a display panel and a parallax-barrier shutter panel,
the display panel comprising a plurality of sub-pixel pairs arranged widthwise at a predetermined pitch, the plurality of sub-pixel pairs each being formed of two sub-pixels displaying different images from each other, the parallax-barrier shutter panel comprising a plurality of sub-openings arranged widthwise, the plurality of sub-openings each being changeable between a light transmittance state and a light block state by driving a liquid crystal layer held between a first transparent substrate and a second transparent substrate with a transparent electrode extending lengthwise, the first transparent substrate of the parallax-barrier shutter panel comprising in a display area, a lower-layer transparent electrode disposed under an interlayer insulating film and an upper-layer transparent electrode disposed on the interlayer insulating film, the lower-layer transparent electrode and the upper-layer transparent electrode being the transparent electrode, and in an area adjacent to the display area, a lower-layer metal wire disposed under the interlayer insulating film and an upper-layer metal wire disposed on the interlayer insulating film, the lower-layer transparent electrode being connected to the lower-layer metal wire.

2. The image display apparatus according to claim 1, wherein the upper-layer transparent electrode is connected to the upper-layer metal wire.

3. The image display apparatus according to claim 1, wherein the upper-layer transparent electrode is connected to the upper-layer metal wire through the lower-layer metal wire.

4. The image display apparatus according to claim 1, wherein the lower-layer metal wire is formed in a layer directly on or directly under the lower-layer transparent electrode.

5. The image display apparatus according to claim 1, wherein the upper-layer metal wire is formed in a layer directly on or directly under the upper-layer transparent electrode.

6. The image display apparatus according to claim 1, wherein an electrical connection between the lower-layer metal wire and the upper-layer metal wire is established through a connection wire formed of a transparent conductive film in the same layer as the upper-layer transparent electrode via a contact hole formed in the interlayer insulating film.

7. The image display apparatus according to claim 1, wherein the upper-layer transparent electrodes that are in electrical common or the lower-layer transparent electrodes that are in electrical common are electrically connected to the upper-layer metal wire in common.

8. The image display apparatus according to claim 1, wherein the upper-layer metal wire comprises an upper surface covered in whole with a transparent conductive film in the same layer as the upper-layer transparent electrode.

9. The image display apparatus according to claim 1, further comprising a protective insulating film disposed on the upper-layer transparent electrode and the upper-layer metal wire.

* * * * *